US009873226B2

(12) United States Patent
Boquillon

(10) Patent No.: US 9,873,226 B2
(45) Date of Patent: Jan. 23, 2018

(54) DECORATIVE WELDING ROD FOR SURFACE COVERINGS

(75) Inventor: Nicolas Boquillon, Beuvry (FR)

(73) Assignee: Tarkett GDL, Lentzweiler (LU)

( * ) Notice: Subject to any disclaimer, the term of this patent is extended or adjusted under 35 U.S.C. 154(b) by 953 days.

(21) Appl. No.: 13/201,567

(22) PCT Filed: Feb. 19, 2010

(86) PCT No.: PCT/EP2010/052095
§ 371 (c)(1),
(2), (4) Date: Sep. 28, 2011

(87) PCT Pub. No.: WO2010/094754
PCT Pub. Date: Aug. 26, 2010

(65) Prior Publication Data
US 2012/0006462 A1    Jan. 12, 2012

(30) Foreign Application Priority Data
Feb. 20, 2009  (EP) ...................... 09153353

(51) Int. Cl.
| B29C 65/12 | (2006.01) |
| B29C 65/00 | (2006.01) |
| B29C 43/22 | (2006.01) |
| B29C 47/04 | (2006.01) |
| B29C 47/00 | (2006.01) |
| B29C 59/04 | (2006.01) |
(Continued)

(52) U.S. Cl.
CPC .......... *B29C 65/125* (2013.01); *B29C 43/222* (2013.01); *B29C 66/305* (2013.01); *B29C 66/71* (2013.01); *B29C 66/73921* (2013.01); *B29C 47/004* (2013.01); *B29C 47/0014* (2013.01); *B29C 47/0016* (2013.01); *B29C 47/0019* (2013.01); *B29C 47/0021* (2013.01); *B29C 47/0038* (2013.01); *B29C 47/0064* (2013.01); *B29C 47/0066* (2013.01); *B29C 47/043* (2013.01); *B29C 59/04* (2013.01); *B29C 2793/009* (2013.01); *B29C 2793/0063* (2013.01); *B29K 2027/06* (2013.01); *B29K 2101/12* (2013.01); *B29K 2105/007* (2013.01); *B29K 2105/0038* (2013.01); *B29K 2105/16* (2013.01); *B29K 2995/0021* (2013.01); *Y10T 156/10* (2015.01); *Y10T 428/24372* (2015.01)

(58) Field of Classification Search
CPC ......... B32B 27/00; B32B 27/04; B32B 27/06; B32B 3/00; B29C 66/1122; B29C 66/43
USPC ............................................. 428/57, 141–143
See application file for complete search history.

(56) References Cited

U.S. PATENT DOCUMENTS

| 2,918,702 A | 12/1959 | Wetterau |
| 3,010,866 A | 11/1961 | Douchet |
(Continued)

FOREIGN PATENT DOCUMENTS

| DE | 203 21 027 U1 | 9/2005 |
| EP | 0 775 563 A2 | 5/1997 |
| WO | WO 00/26004 A1 | 5/2000 |

*Primary Examiner* — Nathan Van Sell
(74) *Attorney, Agent, or Firm* — Reinhart Boerner Van Deuren P.C.

(57) ABSTRACT

The present invention relates to a decorative welding rod, and to a method to produce a decorative welding rod, comprising a gelified plastisol-based composition comprising a PVC resin in a benzoate plasticizer, and unfused and coloured PVC-based particles.

10 Claims, 4 Drawing Sheets

(51) Int. Cl.
*B29K 105/00* (2006.01)
*B29K 101/12* (2006.01)
*B29K 105/16* (2006.01)
*B29K 27/06* (2006.01)

(56) References Cited

U.S. PATENT DOCUMENTS

| | | | | |
|---|---|---|---|---|
| 4,501,783 | A | * | 2/1985 | Hiragami et al. ............ 428/147 |
| 4,965,299 | A | * | 10/1990 | Timm et al. .................. 523/437 |
| 5,246,765 | A | | 9/1993 | Lussi et al. |
| 5,358,993 | A | * | 10/1994 | Timm et al. .................. 524/445 |
| 5,627,231 | A | * | 5/1997 | Shalov et al. ................ 524/523 |
| 5,635,266 | A | | 6/1997 | Quinn et al. |
| 5,645,889 | A | * | 7/1997 | Potosky et al. ............... 427/256 |
| RE36,458 | E | * | 12/1999 | Quinn et al. .................... 428/57 |
| 2003/0072936 | A1 | | 4/2003 | Balmer et al. |
| 2008/0234414 | A1 | * | 9/2008 | Godwin et al. ............... 524/112 |

\* cited by examiner

DECORATIVE WELDING ROD FOR SURFACE COVERINGS

FIELD OF THE INVENTION

The present invention relates to a decorative welding rod joining elements of a surface covering. The present invention also relates to a method for producing such decorative welding rod.

PRIOR ART AND RELATED TECHNICAL BACKGROUND

PVC-based, polyolefin-based or rubber-based surface coverings are widely used to decorate buildings or houses surfaces as they are more pleasant, more aesthetic and more comfortable than painted surfaces. However, these surface coverings, especially floor coverings, are generally produced in tiles or panels that have to be joined one to the others. For this purpose, the use of a welding rod is well known. Usually, a round cross-section thermofusible welding rod is introduced in a hot-air welding device heating the welding rod that penetrates into the space between two pieces of adjacent floor-covering elements and joins them together. Once cooled-down, the excess of welding rod is cut off, or skived, with a "U"-shaped cutter.

Welding rods are usually polymeric compositions having good adhesion to the covering elements to be joined, and allowing the welding rod to have flexibility at temperatures lower than the composition of the elements to be joined, while being easily cut off after welding. Furthermore, a welding rod has a melt temperature lower then the floor-covering elements to join, to avoid the melting of said floor-covering elements when joining them with the welding rod.

For floor coverings having a multicolour decorative pattern, it has been suggested to use multicoloured welding rods. Thus, from an aesthetic point of view, the welding rod has to emulate the aspect or the pattern of the surface covering.

Generally, for PVC-based coverings, multicoloured welding rods are PVC-based compositions and are produced by extrusion. However, extruded coloured welding rods appear as a seam of a contrasting colour (FIGS. 1 to 3), as they are unable to properly reproduce a complex multicoloured pattern, especially a three-dimensional covering pattern.

For coverings comprising a multicoloured chips-image or presenting a three-dimensional aspect, decorative welding rods incorporating multicoloured chips or granules were developed. However, for such decorative welding rods, the extrusion process was not suitable because of the conflicting requirements for the extrusion process and for the welding process of surface covering elements.

Therefore, it has been suggested to produce decorative welding rods by pressing a PVC-film, which has been calendered beforehand, in a half-round embossing mould, as described in EP 0 775 563.

WO 00/26004 describes a process in which coloured granules are spread onto a conveyor belt having grooves and said granules are then hot-pressed to melt one to the others, in order to form a sheet which is then cut into welding rods. While U.S. Pat. No. 5,635,266 describes a process in which coloured chips are deposited on a support carrier and consolidated into a sheet, which is cut into strips and press-moulded into half-round cross-section welding rods.

In addition, US2003/0072936 describes a process in which a first layer of pigmented PVC particles are deposited onto a release paper and a second layer of transparent or translucent solid PVC particles is deposited onto the pigmented particles, particles of the first and the second layer being fused with heat and pressure in a rolling press process.

However, if the welding rods of the prior art emulate the colours and the general aspect of the floor-covering elements to weld, they are not visually integrated to the pattern of the floor covering. Especially for three-dimensional coverings, the chip image of the welding rod creates an image that is different from the original covering, leading to a discontinuity in the pattern of the surface covering.

A solution to emulate the aspect of the floor-covering elements to weld can consist in producing a plurality of welding rods by hot-embossing one or two decorative surface-covering elements in a cylindrical embossing device, as describes in EP 1 619 009; However, as it is well known, a welding rod have to have properties different from those of floor-covering elements, which are usually multiple layers elements. This solution is not satisfying as such welding rods do not present the required properties, for example in terms of melt temperature, flexibility, adhesion and of cut off properties a welding rod should have. Indeed, the welding rod according to EP 1 619 009 do not succeed in an adhesive traction test due do their poor adhesion and joining properties. Furthermore, they do not have a sufficient diameter allowing a good adhesion and an easy cut off.

AIMS OF THE INVENTION

The present invention aims to provide a decorative welding rod and a method to produce this decorative welding rod that do not have the drawbacks of the prior art.

The present invention aims to provide new solutions to decorative welding rods and to methods to produce them.

The invention aims to provide a decorative welding rod visually integrated to the pattern of a floor covering, and a method to produce this decorative welding rod.

The invention aims also to provide a device to implement the method to produce a decorative welding rod.

The invention aims further to provide a floor covering comprising the decorative welding rod.

SUMMARY OF THE INVENTION

The present invention relates to a decorative welding to join elements of a decorative surface covering comprising unfused and coloured PVC-based particles, said welding rod comprising a gelified plastisol-based composition comprising a PVC resin in a benzoate plasticizer, and unfused PVC-based particles having a size and colour identical or corresponding to those used in the decorative surface elements to join.

The expression "plastisol-based composition" should be understood as a composition comprising "plastisol", i.e. a liquid suspension comprising a dispersion of one or different types of PVC into a non-aqueous liquid, i.e. plasticizers.

According to particular embodiments, the welding rod may comprise one or an appropriate combination of any of the following characteristics:
- the plastisol-based composition further comprises a phthalate plasticizer and/or a phosphate plasticizer,
- the benzoate plasticizer represents between 2.5% wt and 34% wt of the total weight of the composition,
- the ratio between the benzoate plasticizer and the other phthalate and/or phosphate plasticizer is between 5 and 100, the plastisol-based composition comprises an additive, said additive been a stabilizer, a deairing agent, a viscosity depressant, a pigment, or a mixture thereof,
the PVC-based particles represent up to 50% wt of the total weight of the plastisol-based composition.

The invention relates to a method to produce a decorative welding rod according to the invention comprising the steps of providing PVC-based particles having a size and colour identical or corresponding to those used in the decorative surface elements to join, providing a liquid suspension of a PVC resin in a benzoate plasticizer, mixing said coloured PVC-based particles to said suspension to form a plastisol-based composition, depositing said plastisol-based composition onto a heat-resistant band-shape carrier, heating said plastisol-based composition to gel said plastisol-based composition to form a sheet, embossing said sheet with an embossing device to form a plurality of welding rods.

According to particular embodiments, the method according to the invention may comprise one or a combination of any of the following characteristics:
the liquid suspension of the PVC resin further comprises a phthalate plasticizer and/or a phosphate plasticizer,
the embossing device comprises two engraved cylinders cooperating to obtain rods with a substantially circular section.

The present invention also relates to a floor covering comprising a weld realised with the welding rod according to the invention.

SHORT DESCRIPTION OF THE DRAWINGS

DETAILED DESCRIPTION OF THE INVENTION

A welding rod for surface coverings has to conciliate not only aesthetical requirements, but also many mechanical requirements (flexibility, adhesion, . . . ) that are different from those of floor-covering elements.

The present invention relates to a decorative welding rod 5, and to a method for producing such a decorative welding rod joining floor-covering elements, particularly PVC-based covering elements, more particularly PVC-based covering elements 2 comprising multicoloured chips or granules image, or PVC-based covering elements 1 or 3 comprising a three-dimensional effect.

Contrary to welding rods according to the prior art 4, the decorative welding rod 5 according to the invention present the advantage of having the required properties of a welding rod, but also of being visually integrated to three-dimensional or granules image floor covering.

The decorative welding rod 5 according to the invention comprises a gelified plastisol-based composition comprising a PVC resin suspended in a plasticizer, and substantially comprising the same PVC-based particles than those used in the decorative surface elements to join, i.e. PVC-based particles identical or equivalent to those used in the decorative surface elements to join.

Figure 1:
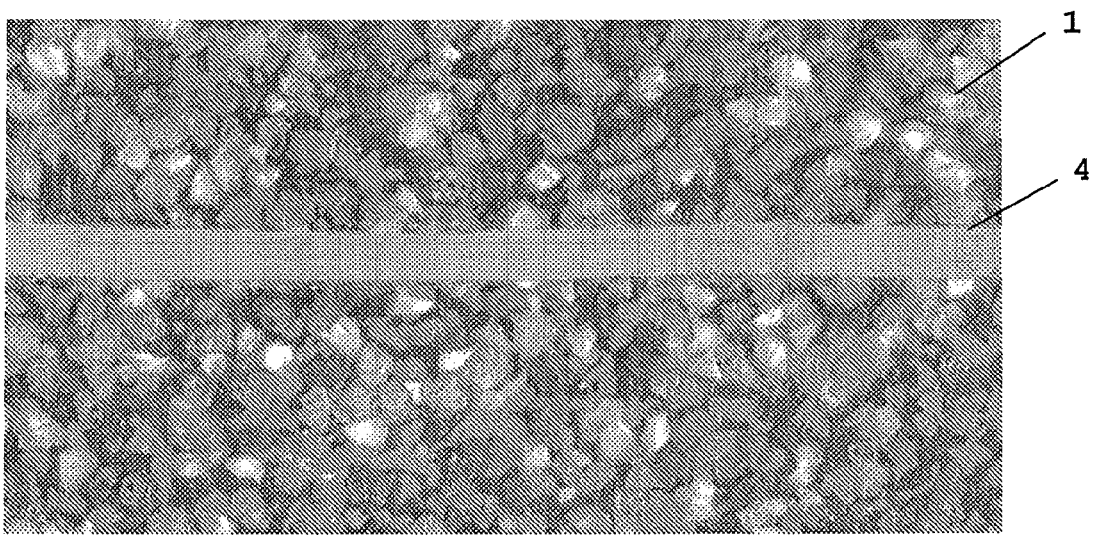
FIG. 1 represents a welding rod according to the prior art joining three-dimensional floor-covering elements.
Figure 2:
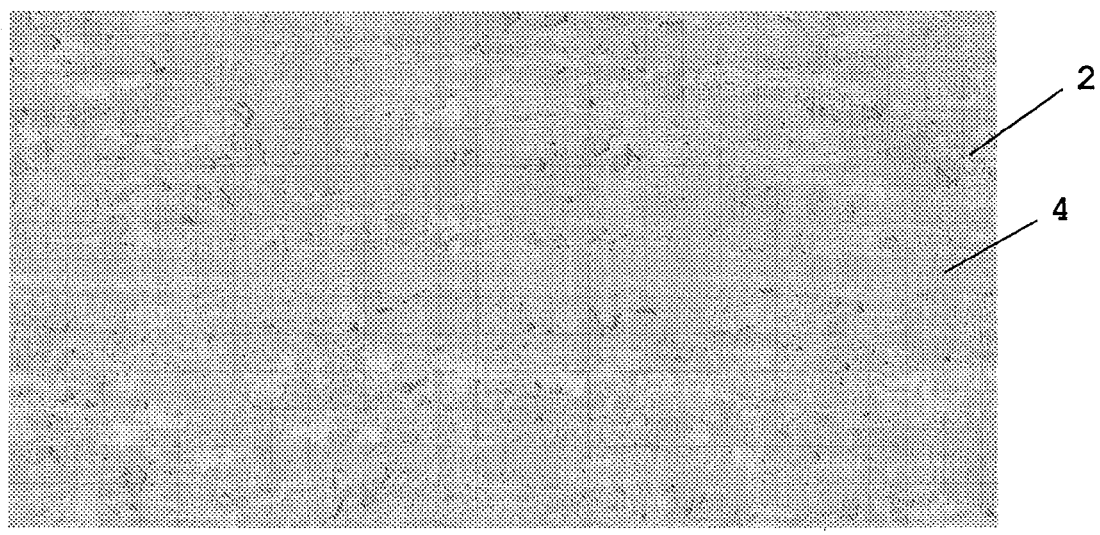
FIG. 2 represents a welding rod according to the prior art joining jasped floor-covering elements.
Figure 3:
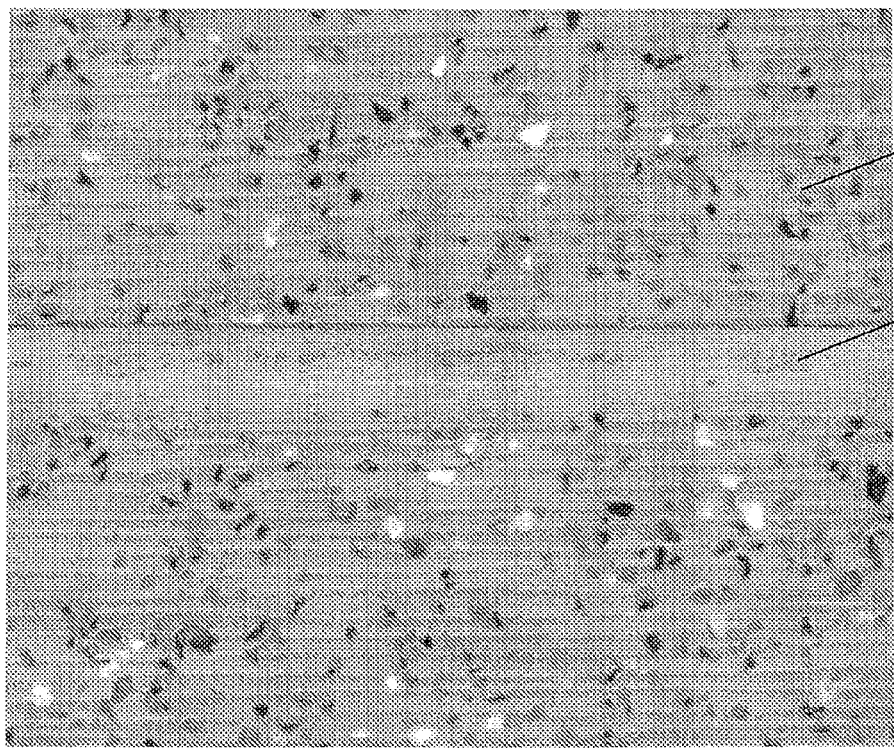
FIG. 3 represents a welding rod according to the prior art joining floor-covering elements comprising a multicoloured-chips image.
Figure 4:
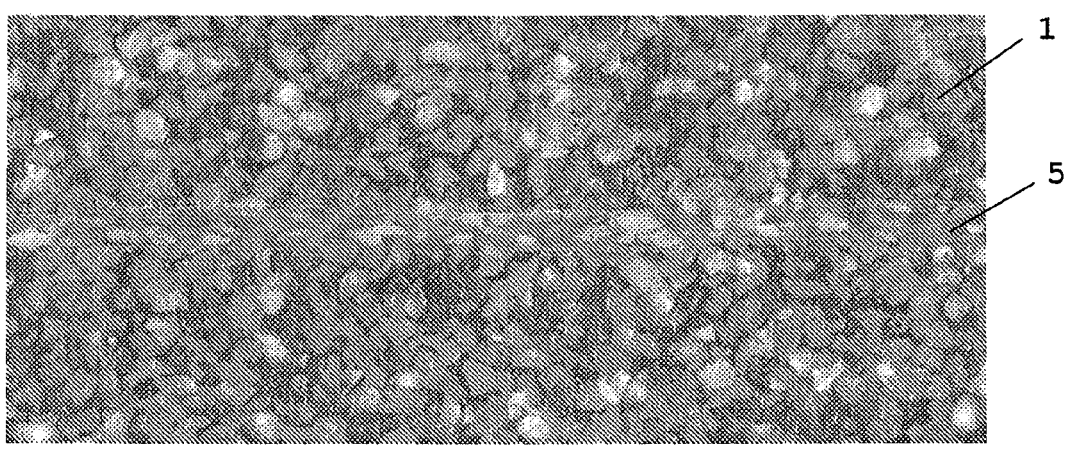
FIG. 4 represents the welding rod according to the invention joining three-dimensional floor-covering elements.

The advantage of using a plastisol-based composition is that, in addition to enabling the welding rod to have good adhesion to any PVC-based surface coverings, it enables to get a welding rod 5 that can identically or similarly reproduce the aspect of a large number of multicoloured pattern coverings (FIGS. 4 to 6), by adapting the size and colour of the unfused and coloured PVC-based particles of the rod to those of the covering elements, and optionally by incorporating a pigment. The emulated coverings may be homogenous or multiple layer coverings, and comprise coloured chips, or granules, or have a coloured pattern printed.

Furthermore, the plastisol-based compositions have the advantage of being implemented in a straight-forward process, a process suitable for producing welding rod reproducing the marble aspect, or the depth aspect, of any floor-covering elements.

The plastisol-based composition is a suspension, or emulsion, of particles of one, or several, homopolymeric or copolymeric PVC resin, suspended in at least one plasticizer, the plasticizer being a phthalate plasticizer, a benzoate plasticizer, a phosphate plasticizer, or a mixture thereof.

Preferably, the plastisol-based composition comprises a benzoate plasticizer. Preferably, the benzoate plasticizer is either a monobenzoate or a dibenzoate plasticizer, or a mixture thereof. In a preferred embodiment, the monobenzoate is isononylbenzoate or 2-ethylhexylbenzote. In another embodiment, the plasticizer is a dibenzoate plasticizer, preferably a mixture of diethylene glycol dibenzoate and dipropylene glycol dibenzoate.

By providing a thick paste consistency to the plastisol-based composition, the benzoate plasticizer has the advantage of enabling an easier gelation of the composition in a film, for example in a 4mm-thick film, compared to the gelation using classic plasticizers. Furthermore, the benzoate plasticizer has the advantage of giving good stain resistance to the welding rod.

Preferably, the plastisol-based composition comprises a mixture of a benzoate plasticizer and a phthalate plasticizer and/or a phosphate plasticizer. Preferably, the phthalate plasticizer is selected from the group consisting of benzyl butyl phthalate (BBP), di(2-ethylhexyl)phthalate (DEHP), di-isobutyl phthalate (DIBP), Diisodecyl (DIDP), di-isoheptyl phthalate (DIHP), di(isononyl) cyclohexane-1,2-dicarboxylate (DINCH), di-isononyl phthalate (DINP), or a mixture thereof. Preferably, the phosphate plasticizer is selected from the group consisting of cresyl diphenyl phosphate (CDP), di-phenyl 2-ethylhexyl phosphate (EDP), isodecyl diphenyl phosphate (IDP), or a mixture thereof.

The preferred plasticizer mixture is a mixture of diethylene glycol dibenzoate and dipropylene glycol dibenzoate, di-isononyl phthalate (DINP), and cresyl diphenyl phosphate (CDP).

Preferably, the at least one plasticizer represents between 17% wt and 35% wt of the total weight of the composition. Preferably, the benzoate plasticizer represents up to 35% wt of the total weight of the composition, the phthalate plasticizer up to 35% wt of the total weight of the composition, and the phosphate plasticizer up to 15% wt of the total weight of the composition. Preferably, in a plasticizer mixture, the ratio between the benzoate plasticizer and the other plasticizer (phthalate and/or phosphate plasticizer) is between 0.10 and 0.6.

The plastisol-based composition may further comprise an additive which may be a stabilizer, a deairing agent, a viscosity depressant, a pigment or a mixture thereof.

Preferably, the additive represents between 1% wt and 5% wt of the total weight of the composition.

Figure 6:
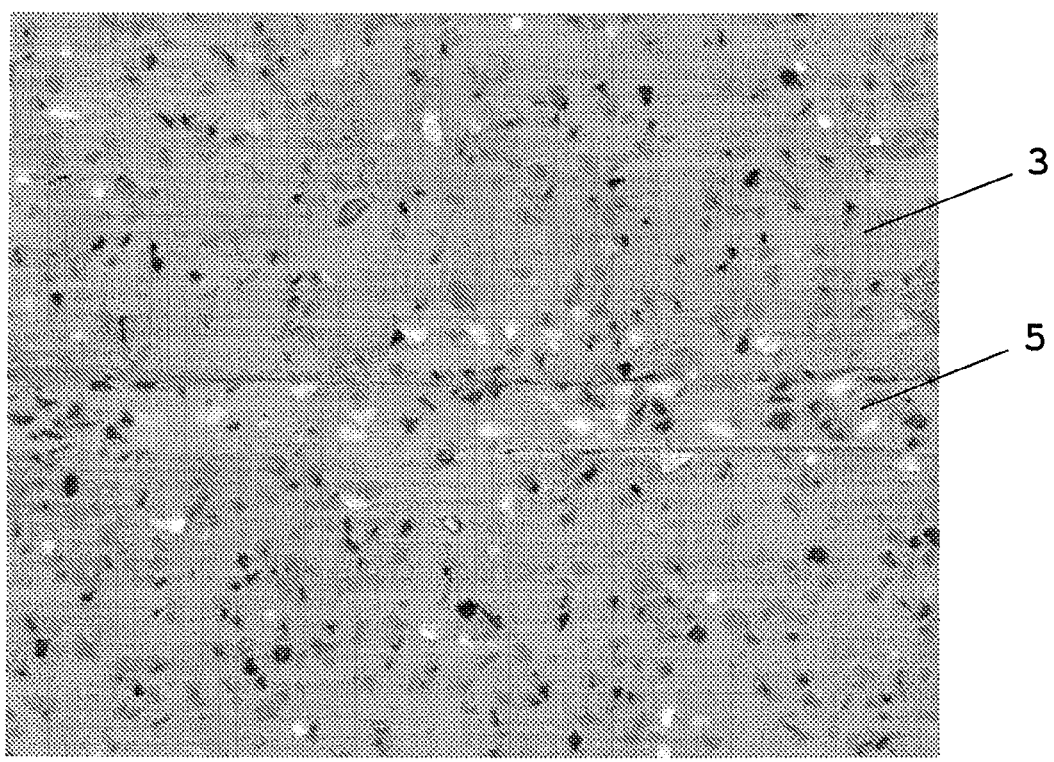
FIG. 6 represents the welding rod according to the invention joining floor-covering elements comprising a multicoloured-chips image.
Figure 7:
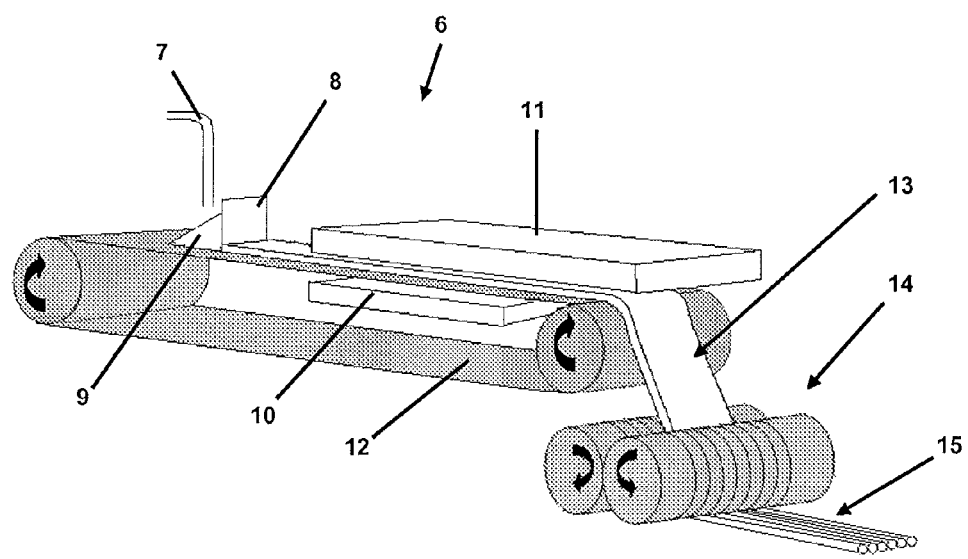
FIG. 7 is a schematic representation of an equipment for producing a welding rod according to the invention.

The plastisol-based composition may be transparent or translucent so that the welding rod emulates a three-dimensional covering (FIG. 4), or may comprise one or several pigments, identical or corresponding to the pigment of the covering elements, so that the welding rod emulates the marble aspect of the covering (FIG. 6).

The multicoloured PVC-based particles in the plastisol-based composition have a size and colour, or colours, identical or corresponding to those of the particles into the floor-covering elements to join. The PVC-based particles may have any suitable shape to participate to the visual integration of the welding rod to the floor covering. In a preferred embodiment, the PVC-based particles have a shape so that, when the welding rod is cut off after welding, they have the appearance of chips or spangles. More preferably, the PVC-based particles are substantially round or spherical.

Preferably, the multicoloured PVC-based particles have a size up to 5 mm, more preferably between 1.2 and 2.8 mm.

Preferably, the multicoloured PVC-based particles represent between 12% wt to 28% wt in respect to 100 parts of PVC resin in the plastisol-based composition.

The PVC-based particles may further comprise a filler, a stabilizer, an antioxidant, a matting agent, a pigment, or a mixture thereof.

Examples of welding rod compositions are given in table 1. The unit "Phr" means "proportion by weight", with respect to 100 parts of the polymer (PVC).

As an example, the phosphate plasticizer is Santicizer1439 from Ferro, Disflamol® DPO or Disflamol® DPK from Lanxess, or Santicizer 148 from Ferro.

As an example, the stabilizer is Lankromark LZC649 from Akcros, Lastab DP34 from Lagor, or Lankromark LZB6137 from Akcros.

As an example, the deairing agent is Byk3105, or Byk3160 or Byk3155 from Byk.

As an example, the viscosity depressant is DP110 from E-chem, Byk5050 or Byk21151 from Byk.

As an example, the pigment is any suitable only limited to aesthetic considerations. Preferably, it is Heliogen Blue K6911D from BASF, Cromophtal® Red BRN from Ciba, or Bayferrox® 318 from Lanxess.

Figure 5:
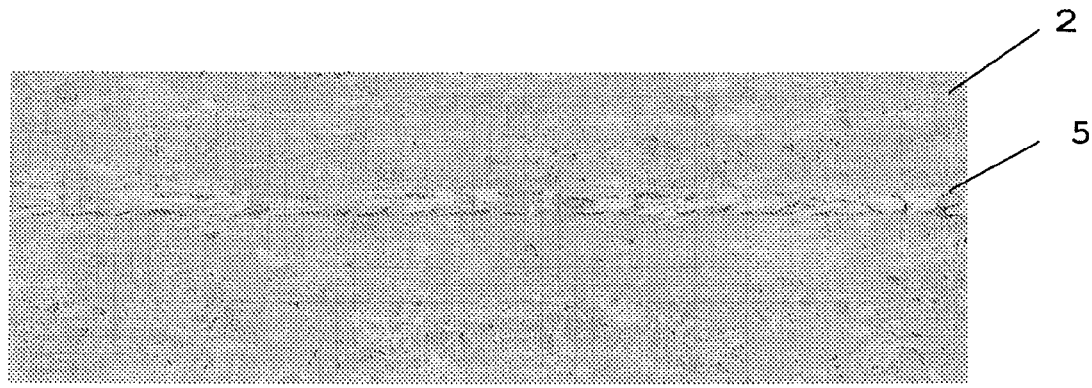
FIG. 5 represents the welding rod according to the invention joining jasped floor-covering elements.

The PVC-based particles are either multicolour particles or particles from different colours; their amount, size and colour, are chosen to match the design of the floor-covering elements to be welded. For example, the PVC-based particles are made of four different colours for a non-directional floor covering having large particles in clear wear layer design effect (Tarkett Century Croma®) (FIG. 4), or made of two different colours for a floor covering having small particles in pigmented wear layer design effect (Tarkett Safetred Universal®) flooring) (FIG. 6), or made of six different colours for a floor covering having a 3D design effect in clear wear layer (Tarkett Safetred Dimension® flooring), or made of multicolour particles for a floor covering having a stone-marble effect (Tarkett Optima® flooring) (FIG. 5).

The multicoloured PVC-based particles are produced by any suitable process. Preferably, they are produced by grounding a coloured PVC-based film calendered beforehand or a PVC-based cord-extruded beforehand. Preferably, the PVC-based sheet, or the cord, has a single colour to give single colour particles. However, the PVC-based sheet, or

| | 1 (Phr) | 2 (Phr) | 3 (Phr) | 4 (Phr) | 5 (Phr) | 6 (Phr) | 7 (Phr) | 8 (Phr) | 9 (Phr) |
|---|---|---|---|---|---|---|---|---|---|
| PVC | 100 | 100 | 100 | 100 | 100 | 100 | 100 | 100 | 100 |
| Benzoate plasticizer | 24.5 | 12 | 28 | 24.5 | 24.5 | 5 | 47 | 57 | 0 |
| Phthalate plasticizer | 26.5 | 17.5 | 30 | 26.5 | 26.5 | 45 | 0 | 0 | 49.84 |
| Phosphate plasticizer | 7 | 7 | 0 | 7 | 7 | 0 | 10 | 0 | 0 |
| Stabilizer | 5.5 | 5.5 | 5.5 | 5.5 | 5.5 | 4.5 | 4.5 | 5.5 | 4.5 |
| Deairing agent | 0.1 | 0.1 | 0.1 | 0.1 | 0.1 | 0 | 0 | 0.1 | 0 |
| Viscosity depressant | 1 | 1 | 1 | 1 | 1 | 7.5 | 7.5 | 0 | 7.5 |
| PVC granules | 30 | 15 | 45 | 45 | 45 | 21.675 | 21.675 | 15 | 21.675 |
| Pigment | 0 | 3 | 0 | 0 | 3.5 | 0 | 0 | 3.5 | 0 |

As an example, the PVC polymer is B7021 or P1430 from Vestolit, or a mixture of 75% PB1704H from Arkema and 25% of Vinnolit C66W from Vinnolit, or a mixture of 69.5% of Pevikon® P1412 from Ineos or E70TT from Vinnolit GmbH and 30.5% of Vinnolit® C66W or C65V from Vinnolit GmbH or 266SC/F from Solvin.

As an example, the benzoate plasticizer is Santicizer 9500 from Ferro, Benzoflex® 181, or Benzoflex® 284, or Benzoflex® 2088 from Velsicol Chemical Corporation.

As an example, the phthalate plasticizer is Jayflex® 77 from Exxon Mobile or Vestinol 9 from Oxeno Olefinchemie GmbH.

the cord, may have different colours, for example with a marbling effect, to give multicoloured particles.

The method to produce decorative welding rod according to the invention comprises a step of depositing a welding rod composition, comprising a plastisol-based composition comprising coloured PVC-based particles, onto a band-shape carrier 12, or belt, preferably without using any other support or substrate, a step of gelling the composition, preferably between 140 to 240° C., more preferably at around 200° C., the gelling step being preferably performed immediately after the deposition of said composition, and a step of embossing the decorative sheet 13 thus obtained in order to form a plurality of welding rod 15.

Preferably, the components of the welding rod composition are blended in a suitable mixer under vacuum to prevent from air entrapment in the welding rod before being deposited on a band-shape carrier 12.

Preferably, the decorative sheet 13 thus produced has a thickness corresponding to the final diameter of the desired welding rod. Preferably, the decorative sheet 13 has a thickness of around 4 mm. Preferably, the welding rod 5 has a diameter of around 4 mm.

The method according to the invention is suitable for different decorative welding rod as it uses the same plastisol-based composition, only the presence of a pigment and/or the type of PVC-based particles changes.

The device 6 to implement the method for producing the welding rod 5 presents the advantage of being a compact device having roughly the size of an extruder.

In a preferred embodiment, the device 6 comprises a paste-feeding pipe 7 for the deposition of the welding rod composition, a knife coater 8 to spread the composition onto, and across, the band-shape carrier 12, and to set the film to the desired thickness, and cheek plates 9 to prevent the welding rod compositing from spreading outside band-shape carrier 12.

The band-shape carrier 12 has the shape of a belt and does not comprise grooves. It is made of any suitable heat-resistant material, made for example of textile, or preferably made of metal, preferably made of stainless steel. Preferably, the band-shape carrier 12 is coated with teflon®. Preferably the band-shape carrier 12 may be heated.

The gelling of the welding rod composition may be done with any suitable device. It may be performed for example by two infrared heating devices, or preferably using two iron plate heating devices 10 and 11, arranged on both sides of the band-shape carrier 12, and in close contact with said band-shape carrier 12.

The device 6 further comprises an embossing device 14 comprising two engraved cylinders, for example made of steel, embossing the decorative sheet 13 to form a plurality of decorative welding rods 15 which can be cut to get single the decorative welding rods.

The invention claimed is:

1. A decorative welding rod to join elements of a decorative surface covering comprising unfused and coloured PVC-based particles having a first size and colour, said welding rod comprising a continuous matrix formed by a gelified plastisol-based composition comprising a PVC resin in a benzoate plasticizer, said continuous matrix having embedded therein unfused PVC-based particles having a second size and colour visually matching the first size and colour of the PVC-based particles used in the decorative surface covering.

2. The decorative welding rod according to claim 1, wherein the plastisol-based composition further comprises a phthalate plasticizer and/or a phosphate plasticizer.

3. The decorative welding rod according to claim 1, wherein the benzoate plasticizer represents between 2.5 % wt and 34 % wt of the total weight of the composition.

4. The decorative welding rod according to claim 2, wherein the ratio between the benzoate plasticizer and the other phthalate and/or phosphate plasticizer is between 5 and 100.

5. The decorative welding rod according to claim 1, wherein the plastisol-based composition comprises an additive, said additive being a stabilizer, a deairing agent, a viscosity depressant, a pigment, or a mixture thereof.

6. The decorative welding rod according to claim 1, wherein the PVC-based particles represent up to 50 % wt of the total weight of the plastisol-based composition.

7. The decorative welding rod according to claim 1. wherein said unfused PVC-based particles represent between 12 % wt and 28 % wt with respect to said PVC resin contained in said continuous matrix.

8. The decorative welding rod according to claim 1, wherein the welding rod has a round cross-section.

9. A decorative welding rod to join elements of a decorative surface covering comprising unfused and coloured PVC-based particles having a first size and colour, said welding rod comprising a continuous matrix formed by a gelified plastisol-based composition comprising a PVC resin in a benzoate plasticizer, said continuous matrix having embedded therein unfused PVC-based particles having a second size and colour identical to the first size and colour of the unfused PVC-based particles used in the elements of the decorative surface.

10. A decorative welding rod to join elements of a decorative surface covering comprising unfused and coloured PVC-based particles, said welding rod comprising a continuous matrix formed by a gelified plastisol-based composition of a PVC resin in at least one plasticizer, said continuous matrix having suspended therein unfused and coloured PVC-based particles in an amount of between 12 % wt to 28 % wt with respect to said PVC resin of said gelified plastisol-based composition, wherein said at least one plasticizer comprises a benzoate plasticizer representing between 17 % wt and 34 % wt, of the total composition.

* * * * *